United States Patent
Rozman et al.

(10) Patent No.: US 7,843,155 B2
(45) Date of Patent: Nov. 30, 2010

(54) DIRECT FLUX REGULATED PERMANENT MAGNET BRUSHLESS MOTOR UTILIZING SENSORLESS CONTROL

(75) Inventors: Gregory I. Rozman, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 348 days.

(21) Appl. No.: 12/100,452

(22) Filed: Apr. 10, 2008

(65) Prior Publication Data

US 2009/0256511 A1  Oct. 15, 2009

(51) Int. Cl.
*H02P 6/16* (2006.01)
(52) U.S. Cl. ............ 318/400.32; 318/400.01; 318/700; 310/156.01
(58) Field of Classification Search .......... 318/400.01, 318/400.32, 700; 310/156.01
See application file for complete search history.

(56) References Cited

U.S. PATENT DOCUMENTS

| | | | |
|---|---|---|---|
| 4,139,790 A * | 2/1979 | Steen | 310/156.83 |
| RE32,100 E | 4/1986 | Rannenberg | |
| 4,719,378 A | 1/1988 | Katsuma | |
| 4,748,360 A * | 5/1988 | Kawada et al. | 310/156.15 |
| 4,929,021 A | 5/1990 | Kaye | |
| 4,942,493 A | 7/1990 | Rozman | |
| 5,055,764 A | 10/1991 | Rozman | |
| 5,144,564 A * | 9/1992 | Naidu et al. | 318/721 |
| 5,363,032 A | 11/1994 | Hanson | |
| 5,650,706 A | 7/1997 | Yamada | |
| 5,844,344 A | 12/1998 | Uetake | |
| 5,973,432 A | 10/1999 | Katagiri | |
| 6,208,110 B1 * | 3/2001 | O'Meara et al. | 318/721 |
| 6,661,150 B2 | 12/2003 | Utsumi | |
| 6,734,666 B2 * | 5/2004 | Voillat | 324/207.16 |
| 6,800,977 B1 * | 10/2004 | Ostovic | 310/156.38 |
| 7,215,059 B1 | 5/2007 | Bitsche | |
| 2003/0233200 A1 | 12/2003 | Petrovic et al. | |

FOREIGN PATENT DOCUMENTS

| | | | |
|---|---|---|---|
| EP | 61042248 | | 2/1986 |
| EP | 0201872 | | 11/1986 |
| GB | 2372885 | * | 9/2002 |
| JP | 11243653 | | 9/1999 |
| JP | 11332277 | | 11/1999 |

OTHER PUBLICATIONS

European Search Report dated Jul. 3, 2009.

* cited by examiner

*Primary Examiner*—Bentsu Ro
*Assistant Examiner*—David S Luo
(74) *Attorney, Agent, or Firm*—Carlson, Gaskey & Olds, PC

(57) ABSTRACT

A permanent magnet rotor for use in a flux regulated permanent magnet brushless machine is constructed such that the inductance along the direct and quadrature axes is markedly different to provide sensorless position feedback for the rotor.

7 Claims, 3 Drawing Sheets

DIRECT FLUX REGULATED PERMANENT MAGNET BRUSHLESS MOTOR UTILIZING SENSORLESS CONTROL

BACKGROUND OF THE INVENTION

This application relates to a permanent magnet flux regulated motor, wherein no sensor is necessary to provide position feedback of the location of the rotor.

In the field of electric motors, permanent magnet motors are known, as are motors utilizing coils for their rotors. Recently, a permanent magnet brushless motor design has been developed, which uses direct flux regulation to provide better control. The stator may include slots which are closed by ferromagnetic wedges. The wedges are provided with control coils fed with current. By controlling the current through the control coils, the overall magnetic flux can be controlled.

To use the overall control of magnetic flux, precise position feedback for the permanent magnet rotor is required. A sensor could be provided; however, a sensor would add to the cost and weight.

Various sensorless control techniques are known, such as detection of back EMF, detection of the stator third harmonic voltage, and detection of the conducting interval of freewheeling diodes connected in antiparallel with solid state switches.

Another method of sensorless control is to sense the inductance variation along the quadrature and direct axes, known as the d and q axes. The direct axis is the center axis of the poles of the permanent magnets, while the quadrature axis is shifted by 45°. This last method is most reliable, and can be implemented at very low speeds, including a zero speed. However, standard permanent magnet motor designs results in very small differences between the inductances along the d and q axes, and thus make implementation of sensorless control utilizing this method difficult.

SUMMARY OF THE INVENTION

In a disclosed embodiment of this invention, a rotor to be associated with a permanent magnet flux regulated motor is constructed such that it will have increased saliency. Essentially, the amount of ferric material through which the d axis and the q axis extend is made to be different, such that the difference in their inductances will also be more readily apparent, and a control will be able to more easily identify the position of the rotor.

These and other features of the present invention can be best understood from the following specification and drawings, the following of which is a brief description.

DETAILED DESCRIPTION OF THE PREFERRED EMBODIMENT

Figure 1:
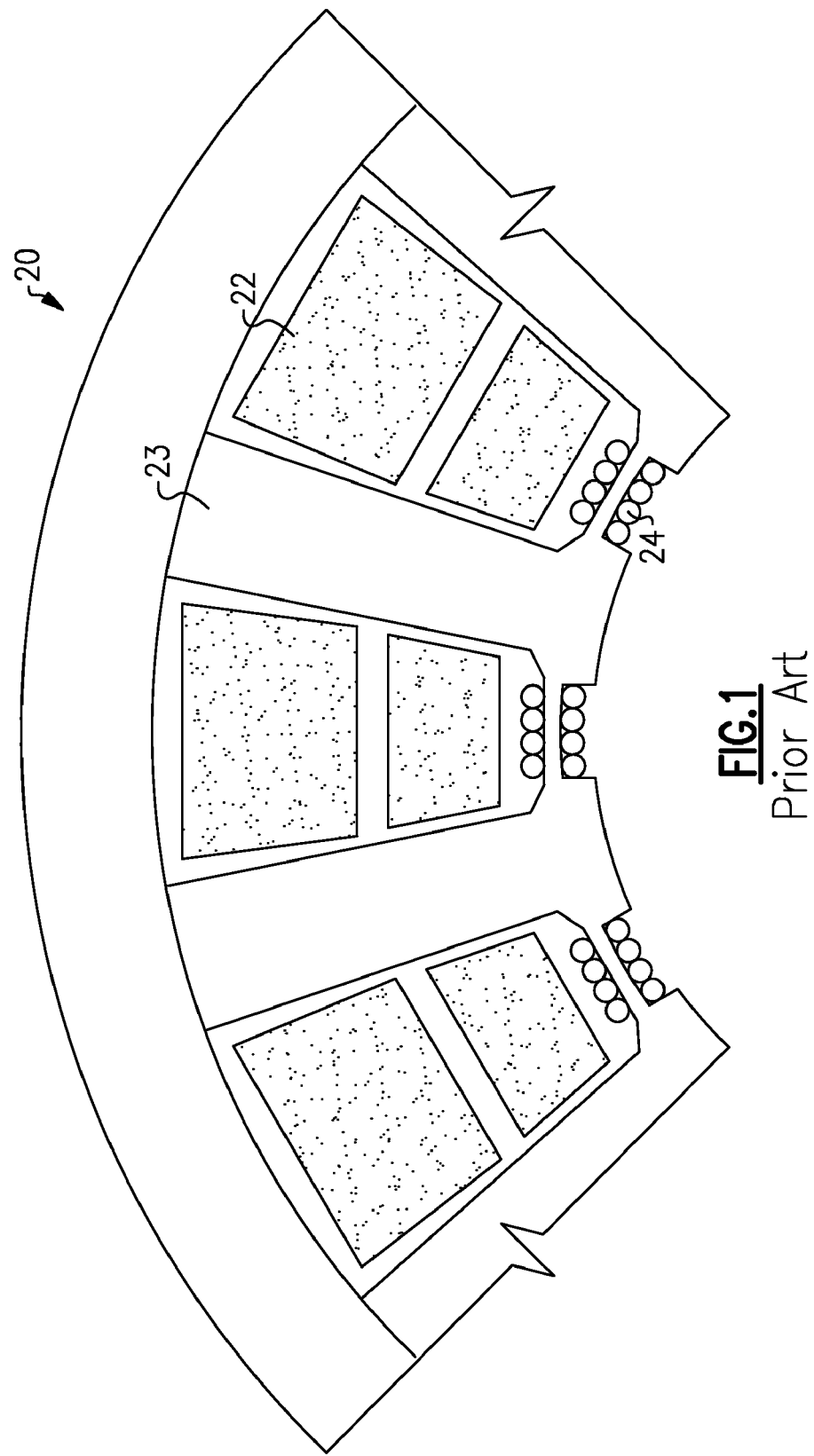
FIG. 1 is a partial cross-sectional view through a stator of a known motor.

As shown in FIG. 1, in a known permanent magnet brushless motor, direct regulation of the magnetic flux is provided. A rotor, not shown in FIG. 1, is a permanent magnetic rotor, and the stator 20 is slotted. Stator slots are provided with wedges 22. Further, control coils 24 are provided. The control coils may receive a DC or an AC current. The coils 24 may be connected in series to create a control winding.

The slot wedges 22 behave as shunts for a magnetic flux produced by the permanent magnet motor. If the reluctance of the wedges is low, a portion of the magnetic flux is shunted by the wedges. While FIG. 1 shows a double layer stator winding or wedges 22, the proposed systems also contemplate a single layer. Stator teeth 23 are positioned between the wedges 22.

The wedges 22 may be made of a laminate ferromagnetic alloys or sintered magnetic powders. The magnetic wedges with the control coils can be inserted directly into conventional stator slots. Instead of round conductors, the control coils 24 can also be wound with rectangular conductors or foil conductors. Alternatively, slot wedges can be stamped together with the stator teeth and after inserting the stator windings into the slots, a wound star-shaped stator core can be pressed into a ring-shaped stator ferromagnetic yoke. This is essentially the construction shown in FIG. 4, however it is not limiting on this application.

Figure 2:
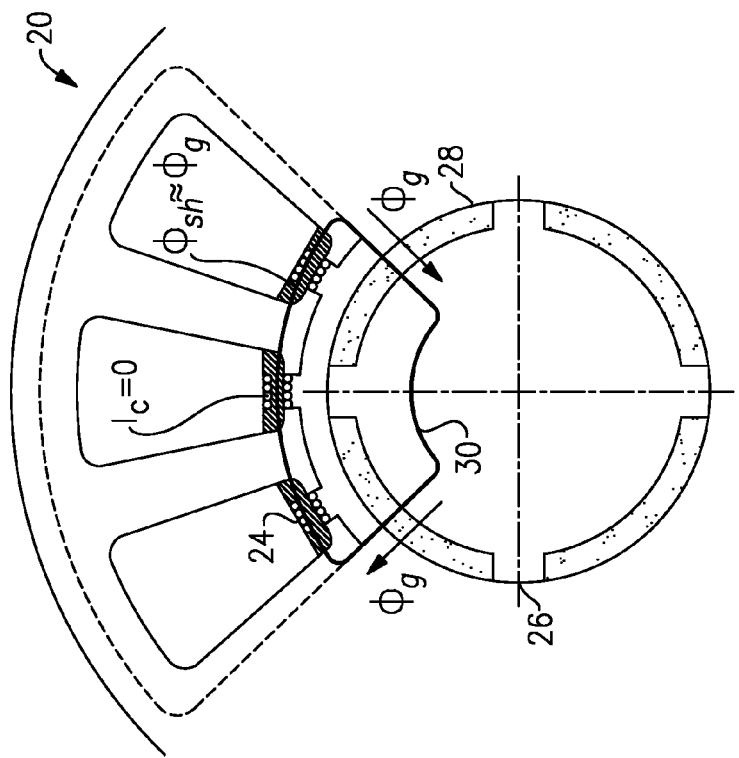
FIG. 2 shows a first position of the known motor.

The reluctance of a ferromagnetic material is inversely proportional to its magnetic permeability. If the control current in the control coils 24 is zero, the reluctance of the magnetic shunt into the wedges 22 is low because its magnetic permeability is high. Almost the total air gap magnetic flux produced by the permanent magnets will pass through the slot wedges. This is as shown in FIG. 2, which illustrates the flow when the current in the coils 24 is zero. The back EMF induced in the stator windings is small because the magnetic flux linked with the stator winding is very small. Relative to the permanent magnet flux, the electromagnetic torque is minimal.

Conversely, when the control current is greater than zero, the slot wedges 22 partially saturate and their magnetic permeability decreases. The reluctance increases and only a portion of the magnetic flux is shunted by the wedges. This is shown, for example, in FIG. 3, which shows the flow passage 32.

The magnetic flux linked with the stator windings increases, and so does the back EMF induced in the stator windings and the electromagnetic torque. Thus, by controlling the control current, the electromagnetic torque can be controlled as well as the EMF.

Increasing the control current further reduces the slot wedge reluctance and its relative magnetic permeability approaches unity. A fully saturated slot wedge behaves as a free space. Almost the whole air gap magnetic flux excited by the rotor permanent magnets will penetrate through the stator teeth and yoke and excites a maximum EMF in the stator winding, and also a maximum electromagnetic torque.

The rotor magnetic flux can induce some AC voltage in the control winding. This voltage can be cancelled by connecting the same terminals (i.e., beginning with beginning and end with end of neighboring shunt coils). Such connection can typically only be done with DC control current.

To properly operate the proposed machines as set forth above, precise position feedback of the rotor is necessary. It would be desirable to achieve this feedback utilizing the inductance variation along the quadrature and direct axes. To maximize the difference in these inductances, the permanent magnet rotor needs to be salient.

In the flux regulated permanent magnet brushless motors the non-salient rotors have not been used.

Figure 4:
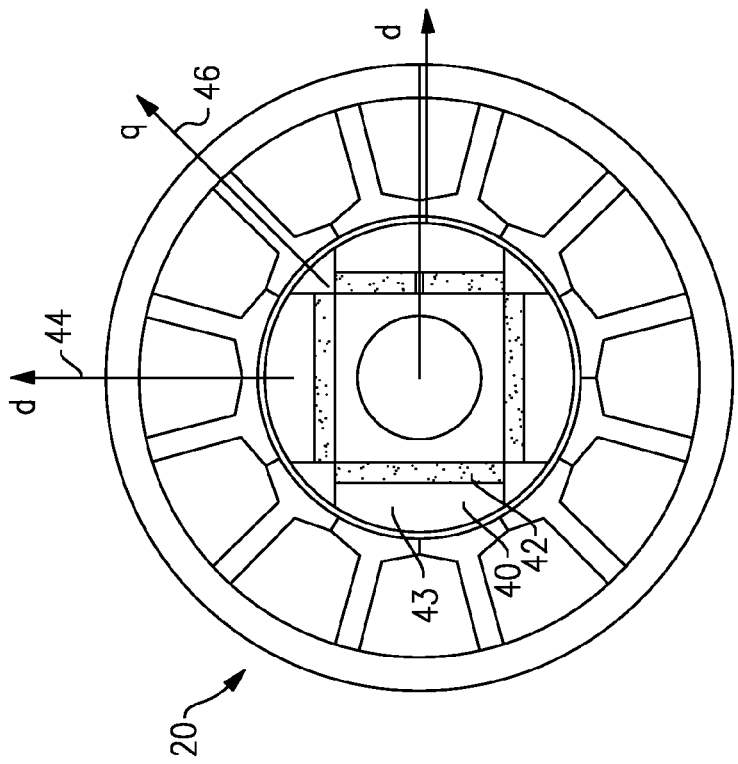
FIG. 4 is a cross-sectional view through an inventive motor.

Proposed embodiments of a permanent magnet rotor 40 are shown in FIG. 4. The magnets 42 are positioned inward of ferric portions 43. As can be appreciated, the d axis passes through the ferric portions and the permanent magnets, while the q axis does not. Thus, the inductances along those two axes will be starkly different, particularly when compared to existing non-salient permanent magnet rotors.

Figure 5:
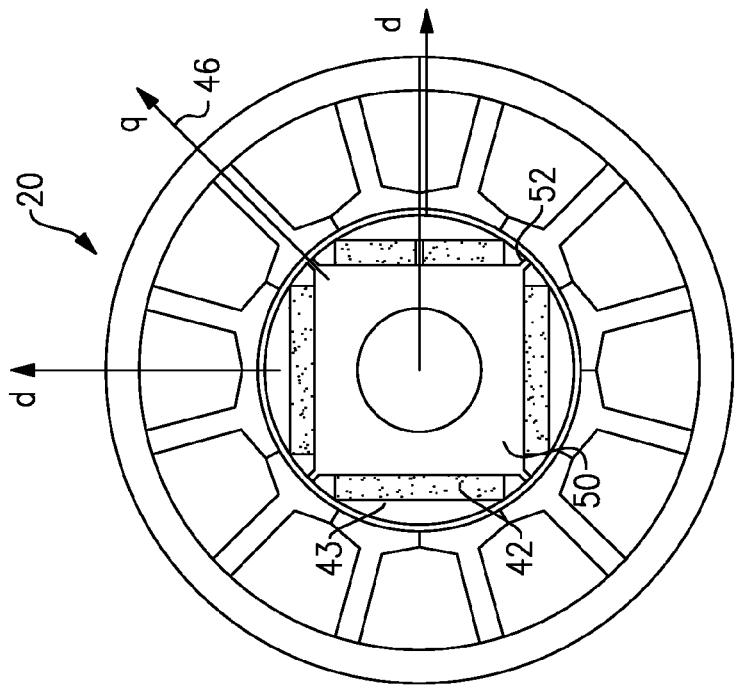
FIG. 5 is a cross-sectional view through a second embodiment.

FIG. 5 shows another embodiment 50 wherein fingers 52 separate the permanent magnets 42 along the q axis. Still, the result will be a marked difference in the inductances along the two axes.

The variable inductance due to the difference between the direct and quadrature axes is sensed by monitoring line-to-neutral voltage of un-energized phase winding during 6-step commutation at a high carrier frequency. The measured voltage variation at carrier frequency is used to identify the position of the rotor as disclosed in the prior art, U.S. Pat. No. 5,363,032.

Figure 3:
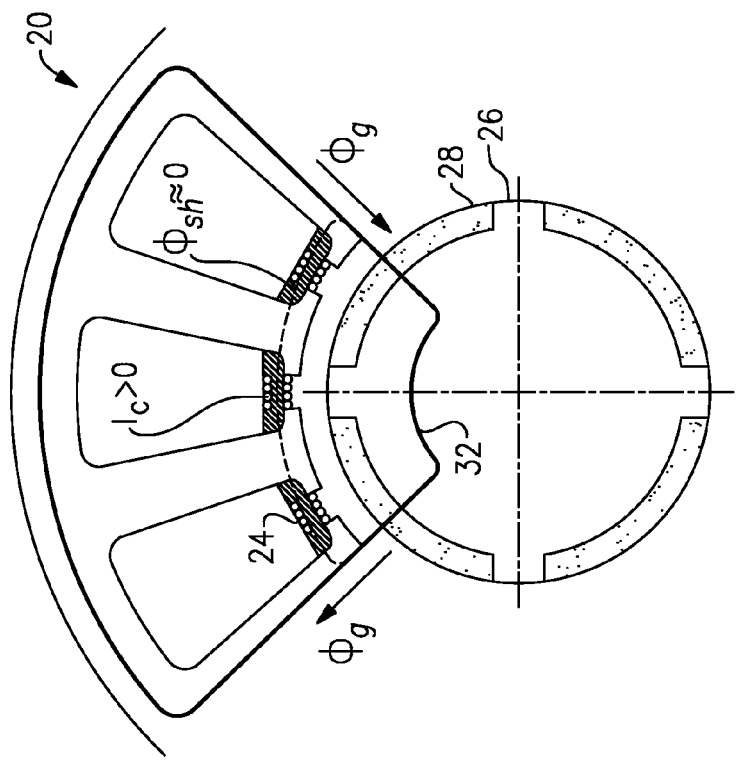
FIG. 3 shows a second position of the known motor.

With this invention, machines such as those shown in FIGS. 1-3, can be provided with simple position feedback about their permanent magnet rotors. Standard stator laminations may be used. The machine has a topology which is typical of standard machines. Good heat transfer is provided because losses can be dissipated in the stator. Further, the mass and volume of the overall motor is smaller, and the machine is less expensive than machines requiring sensors.

Although saliency in the rotor may cause some torque pulsations with a frequency equal to the number of pole pairs per revolution, it also allows easy implementation of the sensorless control of the motor across a wide speed range, including zero speed. Cost reduction and a reliable system operation are thus achieved. Further, the temperature limits which may be imposed on sensors are not encountered, and the motor may be utilized in applications wherein there is insufficient room for a sensor.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A flux regulated permanent magnet brushless motor comprising:
   a stator, said stator having an inner peripheral bore; and
   a permanent magnet rotor mounted within inner peripheral bore, said permanent magnet rotor having a flux path along a direct axis through the poles of the permanent magnets that is different than the flux path along a quadrature axis spaced 45° from the direct axis; and
   said stator being a hybrid-type stator, wherein there are radially outer stator wedges, and radial inner control coils, with said control coils being provided with a control current which may be varied, said current control being selectively increased above zero to partially saturate the outer stator wedges, and decrease their magnetic permeability to regulate the flux of the machine; and
   a difference in a magnetic characteristic along said direct and quadrature axes being evaluated to identify a position of the permanent magnetic rotor.

2. The motor as set forth in claim 1, wherein said rotor includes more ferric material along the direct axis than is positioned along the quadrature axis to achieve the difference in the magnetic characteristics along the axes.

3. The motor as set forth in claim 1, wherein said rotor includes a plurality of permanent magnets which are positioned tangent to a rotational axis of the rotor.

4. The motor as set forth in claim 3, wherein outer ferric caps are positioned radially outwardly of the permanent magnets.

5. The motor as set forth in claim 4, wherein there is no additional ferric material along the quadrature axis.

6. The motor as set forth in claim 5, wherein the permanent magnets are not positioned along the quadrature axis.

7. The motor as set forth in claim 1, wherein stator teeth are positioned between the outer stator wedges.

\* \* \* \* \*